United States Patent
Granston et al.

(10) Patent No.: US 7,721,054 B2
(45) Date of Patent: May 18, 2010

(54) SPECULATIVE DATA LOADING USING CIRCULAR ADDRESSING OR SIMULATED CIRCULAR ADDRESSING

(75) Inventors: Elana D. Granston, Sugarland, TX (US); Jagadeesh Sankaran, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 886 days.

(21) Appl. No.: 11/334,632

(22) Filed: Jan. 18, 2006

(65) Prior Publication Data

US 2006/0174059 A1    Aug. 3, 2006

Related U.S. Application Data

(60) Provisional application No. 60/645,164, filed on Jan. 18, 2005.

(51) Int. Cl.
*G06F 12/00* (2006.01)
*G06F 13/00* (2006.01)
*G06F 13/28* (2006.01)

(52) U.S. Cl. .................................................. 711/154
(58) Field of Classification Search .................. 711/154
See application file for complete search history.

(56) References Cited

U.S. PATENT DOCUMENTS

| | | | |
|---|---|---|---|
| 5,421,022 A * | 5/1995 | McKeen et al. ............... 712/23 |
| 5,721,855 A * | 2/1998 | Hinton et al. ............... 712/218 |
| 5,900,022 A * | 5/1999 | Kranich ...................... 711/205 |
| 6,574,725 B1 * | 6/2003 | Kranich et al. ................. 712/31 |
| 6,658,559 B1 * | 12/2003 | Arora et al. .................. 712/245 |
| 6,963,967 B1 * | 11/2005 | Guthrie et al. ............... 712/225 |
| 7,185,338 B2 * | 2/2007 | Chamdani et al. ........... 718/102 |
| 2002/0062426 A1 * | 5/2002 | Gomez et al. ............... 711/138 |
| 2003/0145190 A1 * | 7/2003 | Faraboschi .................. 712/234 |
| 2004/0216001 A1 * | 10/2004 | Kalla et al. ..................... 714/5 |
| 2004/0221140 A1 * | 11/2004 | Filippo et al. ............... 712/225 |
| 2004/0268095 A1 * | 12/2004 | Shpeisman et al. .......... 712/225 |
| 2005/0013183 A1 * | 1/2005 | Southwell .................... 365/202 |

* cited by examiner

*Primary Examiner*—Sheng-Jen Tsai
(74) *Attorney, Agent, or Firm*—Robert D. Marshall, Jr.; W. James Brady; Frederick J. Telecky, Jr.

(57) ABSTRACT

This invention prevents illegal memory address faults on speculative data loads. Circular addressing of the address pointer limits memory access to a range of addresses including all addresses used by the address pointer and not including any invalid addresses. The invention uses circular addressing hardware, if available on the data processor. If not available, this invention simulates circular addressing. This invention permits loads to be issued earlier than if predication were used and allows already predicated loads to be speculated without the overhead of a compound predicate. This invention can be used on processors without hardware supporting speculation.

5 Claims, 3 Drawing Sheets

US 7,721,054 B2

SPECULATIVE DATA LOADING USING CIRCULAR ADDRESSING OR SIMULATED CIRCULAR ADDRESSING

CLAIM OF PRIORITY

This application claims priority under 35 U.S.C. 119(e)(1) to U.S. Provisional Application No. 60/645,164 filed Jan. 18, 2005.

TECHNICAL FIELD OF THE INVENTION

The technical field of this invention is speculative loading data in data processing operations.

BACKGROUND OF THE INVENTION

Speculative data processing operations are a technique used to increase speed of operation. An instruction is issued on speculation before the input operands are confirmed. If the input operands are later found to have been correct, then the speculative execution saved any time between the issue of the speculative instruction and the time when the operands are confirmed as valid. If the operands are later found to be incorrect, then the instruction is issued with the correct operands. This results in no increase in speed, but generally there is no loss of processing due to the speculative execution. Speculative execution is generally only used in super-scalar data processors or very long instruction word (VLIW) data processors which have vacant or empty instruction issue slots that can be filled by the speculative execution. Super-scalar and VLIW data processors have the capability of issuing more than one instruction each machine cycle. The fastest processing operation occurs when these data processors issue their maximum number of instructions each cycle. However, data dependencies, resource conflicts and other issues often prevent issuing the maximum number of instructions. Speculative execution is a technique intended to permit these otherwise unused instruction slots to be profitably employed. As described above, speculative execution employing unused instruction slots has the potential for performance gain and no performance loss.

Data loads generally have the longest latency of any instructions in super-scalar or VLIW data processors. Differences in the speed of operation of high end data processors and large memories can cause length latency in data loads. Thus speculative execution of data loads may be particularly advantageous. The memory address for such a data load is often stored in a data register as an address pointer. The data in the data register is supplied to the memory to specify the address location storing the desired data. Many data processors use a base plus offset address. A base data register stores a base address and an offset data register stores an offset from the base address. The final memory address is the sum of the base address and the offset. Generally the base address is modified infrequently with most of the variability in the offset. The identity of the address register or offset address register must be known at the time of the issue of a data load instruction. A speculative load can be issued using the data in this known address register or offset register at a time before this load is confirmed valid.

There are two types of possible faults of such speculative loads. The data stored in this address register or offset register may not be proper for the intended data load. This would occur if the data in the address register or data register were changed between the time of the issue of the speculative load instruction and the issue of the actual load instruction. It is also possible that the data stored in the intended memory location is incorrect. This would occur if there were a data write to the memory address between the time of the issue of the speculative load instruction and the issue of the actual load instruction. This invention deals only with the invalid address fault.

A speculative load to an invalid address may cause problems. On many data processors, load instructions to bogus addresses can cause a memory access fault. That is, a load instruction specifying an address not implemented in the system causes an operating system fault. With 32-bit data registers capable of specifying more than 4 billion data words, it is likely that not all possible data values that can be stored in an address register or an offset register point to a valid memory address. Such memory access faults may cause the application to crash or require hundreds or thousands of machine cycles for the operating system to recover. The possibility of such memory faults prevents more frequent use of speculative loads.

If such a speculative load can be restricted to a subset of the address space which known to be accessible without faulting, it may be possible to issue a speculative load earlier in the instruction stream. In many cases, program performance could be significantly improved if a speculative load is issued before the address is confirmed valid. Such early data loading may prevent the algorithm from waiting for data following confirmation of the data address.

There are only two known solutions to this problem. The speculative load may use predication to conditionally prevent an improper load from executing. Using predication delays the load unit the predicate is known. The second known solution uses special purpose hardware. Many data processors do not include special purpose hardware for such speculative loads. Accordingly, another method enabling speculative data loads would be useful in data processors.

SUMMARY OF THE INVENTION

This invention uses circular addressing hardware, if available on the data processor. If not available, this invention simulates circular addressing. Making the address pointer circular restricts the address pointer range. If the circular addressing is set up properly, then the address pointer will always point to a valid memory address. Thus speculative data loads will not cause a memory access fault.

This invention is advantageous because it permits loads to be issued earlier than if predication were used. This invention also allows already predicated loads to be speculated without the overhead of a compound predicate. This invention can be used on processors without hardware supporting speculation.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
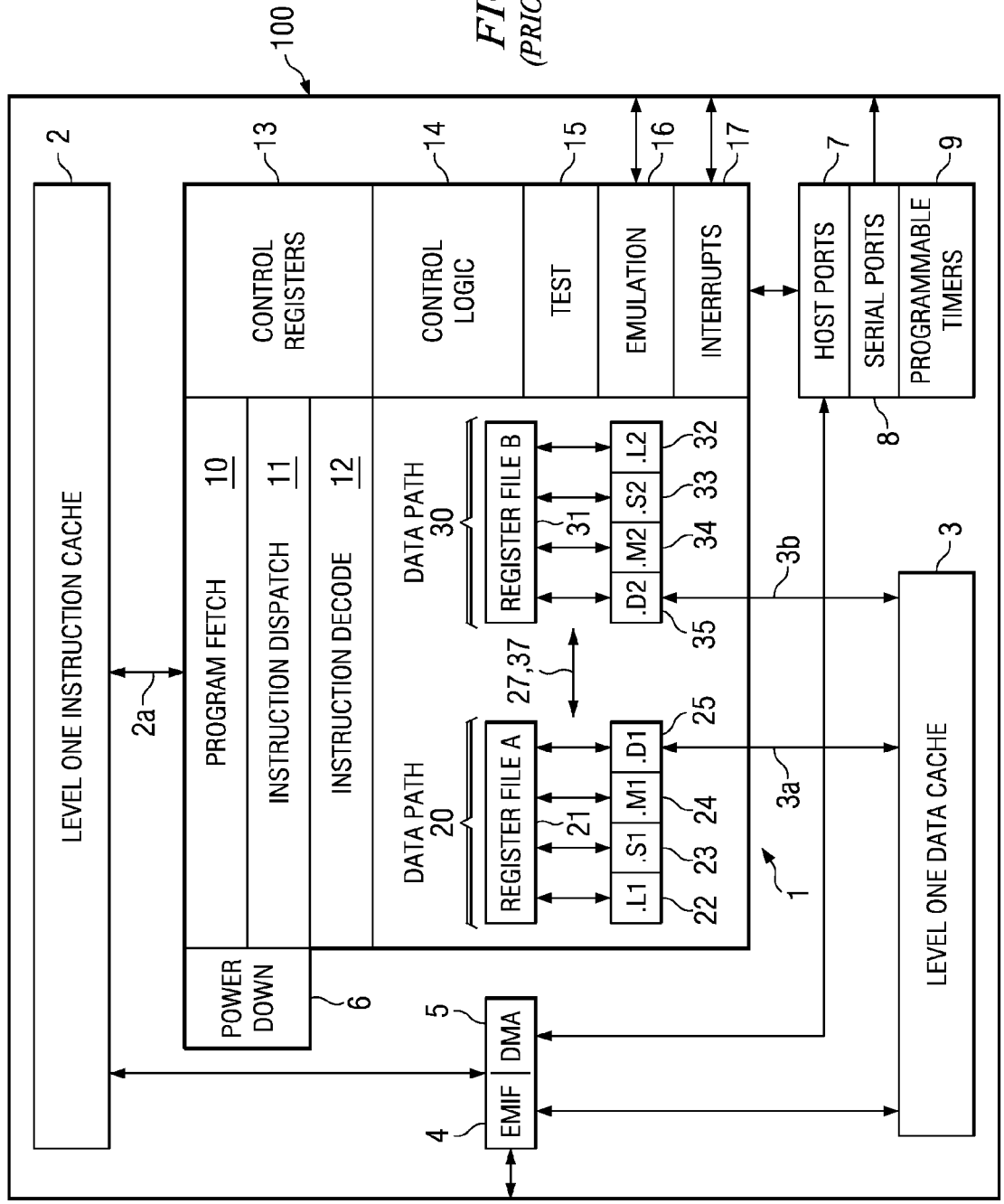
FIG. 1 illustrates details of a very long instruction word digital signal processor integrated circuit suitable for practicing this invention (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache2. When off-chip memory is used, preferably these two spaces are unified into a single memory space via the external memory interface (EMIF) 4.

Level one data cache 3 may be internally accessed by central processing unit 1 via two internal ports 3*a* and 3*b*. Each internal port 3*a* and 3*b* preferably has 32 bits of data and a 32-bit byte address reach. Level one instruction cache 2 may be internally accessed by central processing unit 1 via a single port 2*a*. Port 2*a* of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 2:
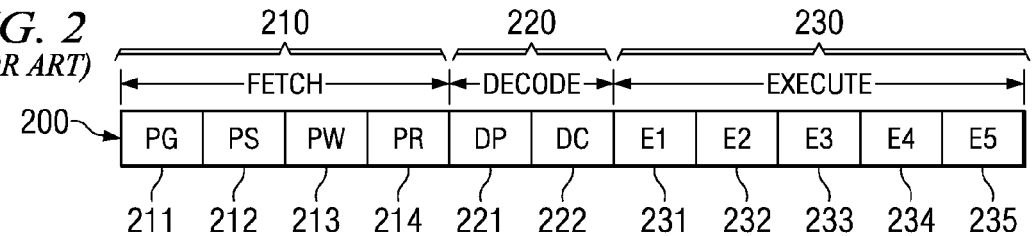
FIG. 2 illustrates the pipeline stages of the very long instruction word digital signal processor integrated circuit illustrated in FIG. 3 (prior art)

FIG. 2 illustrates the pipeline stages 200 of digital signal processor integrated circuit 100 (prior art). These pipeline stages are divided into three groups: fetch group 210; decode group 220; and execute group 230. All instructions in the instruction set flow through the fetch, decode, and execute stages of the pipeline. Fetch group 210 has four phases for all instructions, and decode group 220 has two phases for all instructions. Execute group 330 requires a varying number of phases depending on the type of instruction.

The fetch phases of the fetch group 210 are: Program address generate phase 211 (PG); Program address send phase 212 (PS); Program access ready wait stage 213 (PW); and Program fetch packet receive stage 214 (PR). Digital signal processor integrated circuit 100 uses a fetch packet (FP) of eight instructions. All eight of the instructions proceed through fetch group 210 together. During PG phase 211, the program address is generated in program fetch unit 10. During PS phase 212, this program address is sent to memory. During PW phase 213, the memory read occurs. Finally during PR phase 214, the fetch packet is received at CPU 1.

The decode phases of decode group 220 are: Instruction dispatch (DP) 221; and Instruction decode (DC) 222. During the DP phase 221, the fetch packets are split into execute packets. Execute packets consist of one or more instructions which are coded to execute in parallel. The relationship between a fetch packet and an execute packet will be explained below. During DP phase 222, the instructions in an execute packet are assigned to the appropriate functional units. Also during DC phase 222, the source registers, destination registers and associated paths are decoded for the execution of the instructions in the respective functional units.

The execute phases of the execute group 230 are: Execute 1 (E2) 231; Execute 2 (E2) 232; Execute 3 (E3) 233; Execute 4 (E4) 234; and Execute 5 (E5) 235. Different types of instructions require different numbers of these phases to complete. These phases of the pipeline play an important role in understanding the device state at CPU cycle boundaries.

During E1 phase 231, the conditions for the instructions are evaluated and operands are read for all instruction types. For load and store instructions, address generation is performed and address modifications are written to a register file. For branch instructions, branch fetch packet in PG phase 211 is affected. For all single-cycle instructions, the results are written to a register file. All single-cycle instructions complete during the E1 phase 231.

During the E2 phase 232, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 222.

During E3 phase 233, data memory accesses are performed. Any multiply instruction that saturates results sets the SAT bit in the control status register (CSR) if saturation occurs. Store instructions complete during the E3 phase 233.

During E4 phase 234, for load instructions, data is brought to the CPU boundary. For multiply extensions instructions, the results are written to a register file. Multiply extension instructions complete during the E4 phase 234.

During E5 phase 235, assuming no memory stall load instructions write data into a register. Load instructions complete during the E5 phase 235.

Figure 3:
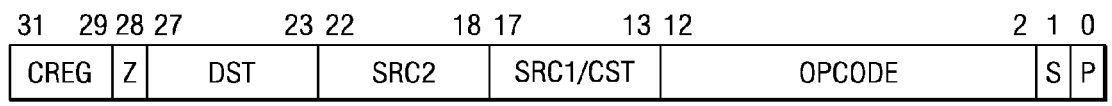
FIG. 3 illustrates the instruction syntax of the very long instruction word digital signal processor integrated circuit illustrated in FIG. 1 (prior art)

FIG. 3 illustrates an example of the instruction coding of instructions used by digital signal processor integrated circuit 100 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | X |

Note that "z" in the z bit column refers to the zero/not zero comparison selection noted above and "X" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 30 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 4:
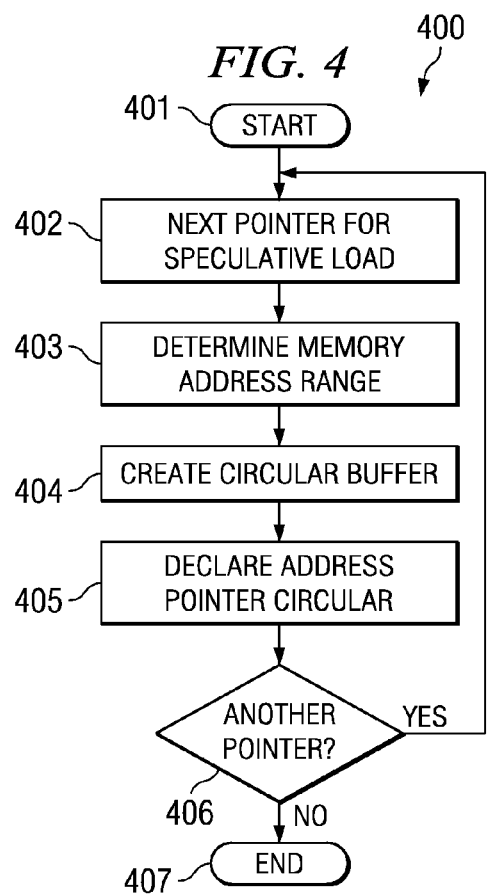
FIG. 4 illustrates a process to set up circular addressing for speculative loads.

FIG. 4 illustrates process 400 showing how to set up circular addressing for speculative loads. Process 400 can be implemented manually by a user or automatically by a compiler. Flow chart 400 begins at start block 401. At block 402 the process considers the next pointer to enable speculative loads. Block 403 determines the address range used by the particular address register or offset register. Block 404 creates a circular buffer including this range and also completely within the memory space implemented by the system.

Figure 5:
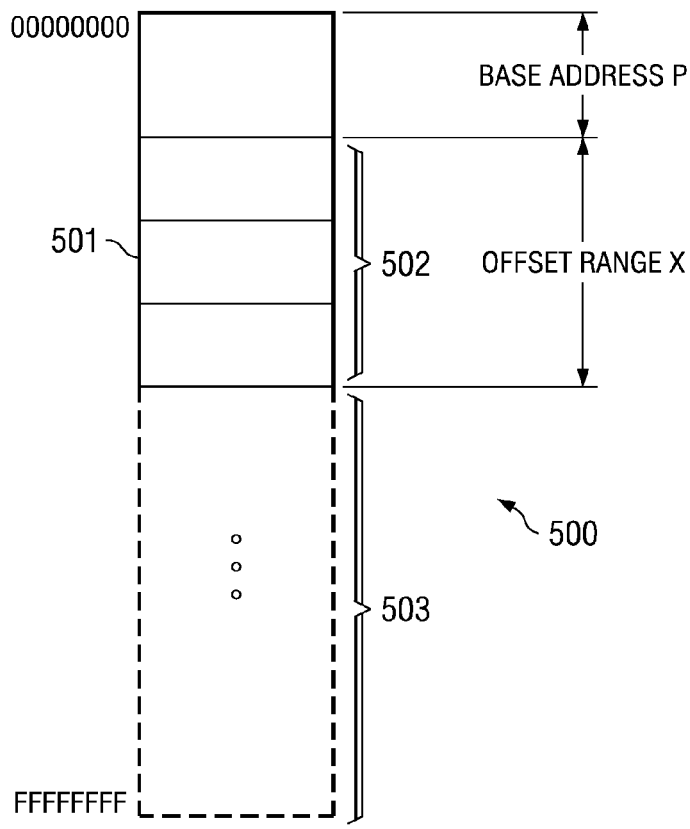
FIG. 5 illustrates an example of the operation of selection of the circular buffer.

FIG. 5 illustrates an example of the operation of block 404. Memory range 500 is a 32-bit addressable memory range from hex00000000 to hexFFFFFFFF. Address range 501 is the range of legal addresses used by the address pointer or offset pointer in question. Circular buffer 502 is an example circular buffer that can be defined for this address range 501. Circular buffer 502 starts at a base address p and includes an offset range x. Typical circular address hardware enables an offset range x that is an integral power of 2, i.e. $2^N$ where N is an integer. Such an offset range x is achieved by limiting the offset pointer to N bits. Note that offset range 502 includes all of address range 501 of the pointer in question and does not fall into illegal address range 503 corresponding to memory addresses having no physical counterpart in the system. Accordingly, no address within offset range 502 will generate a memory access fault due to an illegal, not implemented address.

Block 450 then declares the address pointer to be a circular address pointer. This declaration invokes circular addressing hardware that insures that all accesses using this pointer fall within offset range 502. Any change to the pointer that would tend fall outside this offset range, such as a pointer increment or pointer arithmetic, causes the actual address used to wrap around and alias into offset range 502.

Query block 406 determines if the process will operate on another pointer. If so (Yes at query block 406), then process flow return to block 402 for the next pointer. If not (No at query block 406), flow chart 400 completes at end block 407.

The complier then can create speculative loads using the modified pointer. A speculative load using this pointer will always generate a legal address, that is, an address within the range of memory implemented in this system. The circular addressing hardware insures that the actual memory access generated falls within the offset range regardless of the data in the pointer register. This prevents generation of a memory access fault triggered by an illegal, not implemented address. The speculative load is preferably launched early enough so that the return data arrives at the data processor at the same time as pointer register is determined to be valid. The speculative load address is compared with the confirmed valid address. If these are the same, the data processor uses the data from the speculative load. This assumes that the memory data has not changed from the issue of the speculative load and the confirmation of the address. If these are not the same, then the speculative load data is invalid. The speculative load data is discarded and a new memory load issues for the data at the confirmed valid address. If the speculative load address is confirmed correct, then the algorithm speeds up based upon the early issue of the speculative load relative to when the pointer is confirmed valid.

The above discussion assumes the data processor implements a circular addressing mode in hardware. If circular addressing hardware is not available, it can be simulated. Assume that the address is calculated in the common base/offset manner. That is the actual address used in the sum of the data in a base address register and the date in an offset address register. It will often be the case that a proper circular address buffer of block 404 can be formed by limiting the range of the offset address register. A logical AND of the offset address register data with a mask having N least significant bits 1 and the most significant bits 0 creates a circular buffer address range of $2^N$. A proper circular buffer can be implemented by prefacing each speculative load by this AND operation Offset register AND mask Where: mask is the above described data mask. This process requires an additional operation to condition the speculative load operation. It will often be the case that there will be an unused instruction slot to permit this operation without requiring additional cycles.

Using a buffer size which is a power of 2 and which encloses the data structure but still lies entirely within the range of memory, loads can always be accessed without faulting. The loads can be performing by masking off high bits of the pointer address that are outside of address range.

This invention is applicable only for loads that use offset based addressing with p as the base pointer. The use of circular buffers guarantees that even if an offset is outside the linear range of the array x the address will be wrapped into a legal address using circular addressing. Circular addressing will not apply in a situation where the base pointer p is continuously changing. Fortunately in the domain of irregular loops, while the actual buffer is known, offsets are often computed speculatively and pre-loading these can have a huge benefit on scheduling. Since the buffer has been declared circular, multiple loads can be performed ahead of time, without waiting to make sure which of these offsets lie within the valid range of the buffer.

Efficient software-pipelined schedules for while loops often depend on being able to speculate loads. For one set of example multimedia applications on the Texas Instruments Incorporated TMS320C6000 digital signal processor, the inability of the compiler to speculate loads with unbounded address ranges, such as when the offset is contained in a register, forces the compiler to generate less efficient software pipelined schedules. Simulations indicate that if the compiler is able to speculate these unbounded loads, an average speedup of greater than 1.3 times can be achieved.

Figure 6:
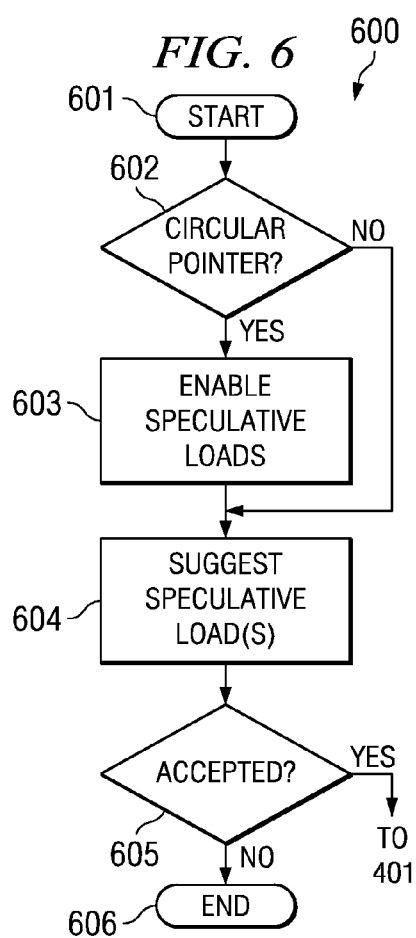
FIG. 6 illustrates use of this invention applied automatically by a compiler.

FIG. 6 illustrates this invention applied automatically by the compiler. Complier process 600 begins at start block 601. Query block 602 checks to determine it an address pointer has been declared a circular address. If so (Yes at query block 602), the compiler assumes that it is safe to speculate loads using this pointer regardless of the actual offset into the pointer by enabling speculative loads in block 603. This may permit the compiler to speculatively schedule loads in more cases resulting in better performance.

In block 604 the compiler may suggest a set of loads that, if made circular and enabled for speculative loads, might lead to better performance. The compiler would search the high level code and determine which address pointers if made circular may aid in speculative loading. The user would then be free to follow or disregard the compiler suggestions in query block 605. Accepted suggestions and previously declared circular pointers flow to block 401 in FIG. 4 (Yes at query block 605). If not accepted (No at query block 605), this complier block ends at end block 606.

This invention works because making a load circular implies making sure that the offset referenced in the load falls within a circular addressing range. Thus no memory access fault would result from speculative loading.

What is claimed is:

1. A method of speculative loading data in a data processor system comprising the steps of:
    determining a range of addresses used by an address pointer stored in an address register;
    creating a circular buffer enclosing said range of addresses and completely within memory addresses of memory implemented in the data processor;
    declaring said address pointer as a circular address pointer having said circular buffer;
    speculatively issuing a data load for memory data at a speculative load address stored in said address register before a fetch address is confirmed valid, said data load employing a circular addressing mode limiting said speculative load address to said range of addresses of said circular buffer preventing a memory access fault due to attempted access to a not implemented memory address;
    when said fetch address is confirmed valid, comparing said confirmed valid address with said speculative load address;
    if said speculative load address equals said confirmed valid address, employing memory data returned by said speculative load; and
    if said speculative load address does not equal said confirmed valid address, discarding said memory data returned by said speculative load and issuing a data load for memory data at said confirmed valid address.

2. The method of claim 1, wherein:
    said step of speculatively issuing a data load employing a circular addressing mode employs circular addressing hardware.

3. The method of claim 1, wherein:
    said address pointer consists of the sum of a base address stored in a base address register and an offset address stored in an offset address register; and
    said step of speculatively issuing a data load employing a circular addressing mode includes logically ANDing said offset address register with a mask having a predetermined number of least significant 1 bits corresponding to a size of said circular buffer and remaining most significant 0 bits.

4. The method of claim 1, further comprising:
    enabling speculative loads for every address pointer declared as a circular address pointer.

5. The method of claim 1, further comprising:
    searching a source code program for address pointers that may usefully employ speculative loading;
    presenting to a user each of said address pointers that may usefully employ speculative loading for the user to select or not select speculative loading; and
    generating object code including speculative loading of address pointers selected by the user.

* * * * *